United States Patent [19]

Thomas et al.

[11] Patent Number: 5,156,768
[45] Date of Patent: Oct. 20, 1992

[54] STABILIZED CHLORINE-CONTAINING REFRIGERATION COMPOSITIONS

[75] Inventors: Raymond H. P. Thomas; Ruth H. Chen, both of Amherst; Kenneth Harris, Buffalo, all of N.Y.

[73] Assignee: Allied-Signal Inc., Morris Township, Morris County, N.J.

[21] Appl. No.: 681,026

[22] Filed: Apr. 5, 1991

[51] Int. Cl.$^5$ ............................................. C09K 5/04
[52] U.S. Cl. .................... 252/384; 252/52 A; 252/52 R; 252/58; 252/68; 252/71; 252/384; 252/404; 252/407
[58] Field of Search ............ 252/404, 407, 52 A, 252/52 R, 49.8, 68, 71, 384, 58

[56] References Cited

U.S. PATENT DOCUMENTS

| | | | |
|---|---|---|---|
| 2,734,032 | 2/1956 | Coppeck | 252/404 |
| 4,248,726 | 2/1981 | Uchimuma et al. | 252/52 |
| 4,267,064 | 5/1981 | Sasaki et al. | 252/52 |
| 4,431,557 | 2/1984 | Shimizu et al. | 252/52 |
| 4,443,349 | 4/1984 | Snyder et al. | 252/49.9 |
| 4,755,316 | 7/1988 | Magid et al. | 252/68 |
| 4,812,246 | 3/1989 | Yabe | 252/327 |
| 4,851,144 | 7/1989 | McGraw et al. | 252/52 |
| 4,900,463 | 2/1990 | Thomas et al. | 252/54 |
| 4,948,525 | 8/1990 | Sasaki et al. | 252/54 |
| 4,959,169 | 9/1990 | McGraw et al. | 252/68 |
| 4,971,712 | 11/1990 | Gorski et al. | 252/52 |
| 4,975,212 | 12/1990 | Thomas et al. | 252/54 |

FOREIGN PATENT DOCUMENTS

| | | |
|---|---|---|
| 51795 | 3/1982 | Japan. |
| 96684 | 5/1985 | Japan. |
| 179699 | 10/1985 | Japan. |
| 281199 | 12/1988 | Japan. |
| 118598 | 5/1989 | Japan. |
| 102296 | 4/1990 | Japan. |

Primary Examiner—Deborah L. Kyle
Assistant Examiner—Valerie Fee
Attorney, Agent, or Firm—Melanie L. Brown; Jay P. Friedenson

[57] ABSTRACT

R12, which contains chlorine, and hydrogen-contributing lubricants react to form acids such as hydrogen chloride and hydrogen fluoride and simultaneously, R12 is converted to R22. Such reactions are undesirable because the acids which form destroy the metallic components of a refrigeration system and cause the breakdown of the lubricants.

The present invention provides a compositions for use in compression refrigeration and air-conditioning which substantially reduce the occurrence of the foregoing problem. The compositions comprise: (a) chlorine-containing refrigerant selected from the group consisting of hydrochlorocarbons, (b) hydrogen-contributing lubricant; and (c) composition comprising: (1) at least one phenol and (2) at least one aromatic epoxide or fluorinated alkyl epoxide wherein the composition (c) substantially reduces the removal of chlorine or chlorine and fluorine from the chlorine-containing refrigerant (a) and replacement of the halogen with hydrogen from the hydrogen-contributing lubricant (b).

11 Claims, No Drawings

STABILIZED CHLORINE-CONTAINING REFRIGERATION COMPOSITIONS

FIELD OF THE INVENTION

The present invention relates to stabilized refrigeration compositions. More particularly, the present invention relates to stabilized refrigeration compositions comprising chlorine-containing refrigerant and a hydrogen-contributing lubricant. Even more particularly, the present invention relates to stabilized refrigeration compositions comprising dichlorodifluoromethane (known in the art as R12) and hydrogen-contributing lubricant. Even more particularly, the present invention relates to stabilized refrigeration compositions of R12, tetrafluoroethane, and hydrogen-contributing lubricant. Preferably, the tetrafluoroethane is 1,1,1,2-tetrafluoroethane (known in the art as R134a). R134a is a refrigerant which may replace R12 in many applications because environmental concerns over the use of R12 exist.

BACKGROUND OF THE INVENTION

Currently, R12 is used in closed loop refrigeration systems; many of these systems are automotive air-conditioning systems. R12 refrigeration systems generally use mineral oils to lubricate the compressor. Mineral oil is typically paraffin oil or naphthenic oil.

A problem which faces the industry is that R12, which contains chlorine, and currently used lubricants such as mineral oil, which contains hydrogen, react to form acids such as hydrogen chloride and hydrogen fluoride and simultaneously, the R12 is converted to R22. Such reactions are undesirable because the acids which form destroy the metallic components of a refrigeration system and also cause the breakdown of the mineral oil. As such, the need exists in the art for an additive which substantially minimizes the reaction of R12 with hydrogen-contributing lubricants such as mineral oil.

R134a has been mentioned as a possible replacement for R12 because concern over potential depletion of the ozone layer exists. R134a has properties similar to those of R12 so that it is possible to substitute R134a for R12 with minimal changes in equipment being required. The symmetrical isomer of R134a is R134 (1,1,2,2-tetrafluoroethane); the isomer is also similar in properties and may also be used. Consequently, it should be understood that in the following discussion, "tetrafluoroethane" will refer to both R134 and R134a.

A unique problem arises in such a substitution. As mentioned earlier, refrigeration systems which use R12 generally use mineral oils to lubricate the compressor; the present discussion does not apply to absorption refrigeration equipment. See for example the discussion in Chapter 32 of the 1980 ASHRAE Systems Handbook. R12 is completely miscible with such oils throughout the entire range of refrigeration system temperatures which may range from about −45.6° C. to 65.6° C. Consequently, oil which dissolves in the refrigerant travels around the refrigerant loop and generally returns with the refrigerant to the compressor. The oil does not separate during condensation, although it may accumulate because low temperatures exist when the refrigerant is evaporated. At the same time, the oil which lubricates the compressor contains some refrigerant which may affect its lubricating property.

It is known in the industry that chlorodifluoromethane (known in the art as R22) and chlorodifluoromethane/1-chloro-1,1,2,2,2-pentafluoroethane (known in the art as R502) are not completely miscible in common refrigeration oils. See Downing, FLUOROCARBONS REFRIGERANT HANDBOOK, Page 13. A solution to this problem has been the use of alkylated benzene oils. Such oils are immiscible in R134a and are not useful therewith. This problem is most severe at low temperatures when a separated oil layer would have a very high viscosity. Problems of oil returning to the compressor would be severe.

R134a is not miscible with mineral oils; consequently, different lubricants will be required for use with R134a. However, as mentioned above, no changes to equipment should be necessary when the refrigerant substitution is made. If the lubricant separates from the refrigerant, it is expected that serious operating problems could result. For example, the compressor could be inadequately lubricated if refrigerant replaces the lubricant. Significant problems in other equipment also could result if a lubricant phase separates from the refrigerant during condensation, expansion, or evaporation. These problems are expected to be most serious in automotive air-conditioning systems because the compressors are not separately lubricated and a mixture of refrigerant and lubricant circulates throughout the entire system.

Small amounts of lubricants may be soluble in R134a over a wide range of temperatures, but as the concentration of the lubricant increases, the temperature range over which complete miscibility occurs, i.e., only one liquid phase is present, narrows substantially. For any composition, two consolute temperatures, i.e., a lower and a higher temperature, may exist. That is, a relatively low temperature below which two distinct liquid phases are present and above which the two phases become miscible and a higher temperature at which the single phase disappears and two phases appear again may exist. A diagram of such a system for R502 refrigerant is shown as FIG. 2 in the Kruse et al. paper mentioned above. A range of temperatures where one phase is present exists and while it would be desirable that a refrigeration system operate within such a range, it has been found that for typical compositions, the miscible range of lubricants with R134a is not wide enough to encompass the typical refrigeration temperatures.

In response to the foregoing need in the art, lubricants which are miscible with R134a have been developed. See commonly assigned U.S. Pat. Nos. 4,755,316; 4,900,463; and 4,975,212.

The industry faces another problem in the substitution of R134a for R12. Upon the conversion of a refrigeration system to R134a and the addition of substitute hydrogen-contributing lubricant which is miscible with R134a to the system, the industry is concerned that any R12 remaining in the system would be incompatible with the substitute hydrogen-contributing lubricant. It is believed that R12, which contains chlorine, and the hydrogen-contributing substitute lubricants react to form acids such as hydrogen chloride and hydrogen fluoride and simultaneously, the R12 is converted to R22. Such reactions are undesirable because the acids which form destroy the metallic components of a refrigeration system and cause the breakdown of the lubricant.

Although all of the R12 in a system being retrofitted for R134a and hydrogen-contributing lubricant miscible with R134a could be removed, the industry is seeking a more acceptable solution to the problem.

If an additive substantially minimized the reaction of R12 with currently used hydrogen-contributing lubricants and also hydrogen-contributing lubricants which are miscible with R134a, any R12 remaining in a system which is being retrofitted with R134 would not have to be removed from the system and the preceding problem would be substantially eliminated. As such, the need exists in the art for an additive which prevents the reaction of R12 with hydrogen-contributing lubricants.

In an attempt to solve this problem, we considered epoxides as taught by Kokai Patent Publication 179,699 published Oct. 12, 1984; and Kokai Patent Publication 281,199 published Dec. 11, 1988. As shown in Comparative C below, we added epoxides to compositions of R12 and mineral oil and found that epoxides alone were ineffective in substantially reducing the reaction of R12 with mineral oil. As shown in Comparative H below, we added epoxides to compositions of R12 and hydrogen-contributing lubricants miscible with R134a and found that epoxides were ineffective in substantially reducing the reaction of R12 with the lubricants.

Also in an attempt to solve this problem, we considered phenols as listed in commonly assigned U.S. Pat. No. 4,755,316; Kokai Patent Publication 281,199 published Dec. 11, 1988; U.S. Pat. Nos. 4,812,246 and 4,851,144; commonly assigned U.S. Pat. No. 4,900,463; Kokai Patent Publication 102,296 published Apr. 13, 1990; U.S. Pat. No. 4,959,169; and commonly assigned U.S. Pat. No. 4,975,212. As shown in Comparative B below, we added phenols to compositions of R12 and mineral oil and found that the hindered phenols alone were ineffective in substantially reducing the reaction of R12 with mineral oil. As shown in Comparatives G and I below, we added phenols to compositions of R12 and hydrogen-contributing lubricants miscible with R134a and found that phenols alone were ineffective in substantially reducing the reaction of R12 with the lubricants.

We were then surprised to find that the combination of aromatic epoxide and phenol is effective in substantially reducing the reaction of R12 with mineral oil. We were also surprised to find that the combination of aromatic epoxide and phenol is effective in substantially reducing the reaction of R12 with hydrogen-contributing lubricants which are miscible with R134a. We were also surprised to find that the combination of aromatic epoxide and phenol is effective in substantially reducing the reaction of R12 with mineral oil and hydrogen-contributing lubricants which are miscible with R134a.

U.S. Pat. Nos. 4,248,726; 4,267,064; and 4,431,557 teach the addition of epoxides to compositions of refrigerants and lubricants. The references also teach that known additives such as phenol or amine type antioxidants; sulphur or phosphorus type oiliness improvers; silicone type antifoam agents; metal deactivators such as benzotriazole, amines, and acid esters; and load carrying additives such as phosphoric acid esters, phosphorous acid esters, thiophosphoric acid esters, organic sulfur compounds, and organic halogen compounds can be used. These references do not teach or suggest the present invention.

U.S. Pat. No. 4,948,525 teaches that known refrigerator oil additives such as phenol-type antioxidants such as di-tert-butyl-p-cresol; amine-type antioxidants such as phenyl-α-naphthylamine and N,N'-di(2-naphthyl)-p-phenylenediamine; load resistant additives such as zinc dithiophosphate, chlorinated paraffin, fatty acids, and sulfur type load resistant compounds; silicone-type antifoaming agents; metal inactivators such as benzotriazole; and hydrogen chloride captors such as glycidyl methacrylate and phosphite esters may be used in refrigeration compositions. The reference states that these additives may be used singly or jointly but does not teach or suggest the present invention.

SUMMARY OF THE INVENTION

Thus the present invention provides a stabilizing composition which substantially reduces the reaction of R12 with mineral oil. The stabilizing composition comprises (i) phenol and (ii) aromatic or fluorinated alkyl epoxide.

In accordance with the present invention, phenol and aromatic or fluorinated alkyl epoxide are added to a refrigeration system containing R12 and currently used hydrogen-contributing lubricant. As mentioned previously, we have found that in the presence of phenol and aromatic epoxide, R12 and currently used hydrogen-contributing lubricants form only minimal amounts of acids such as hydrogen chloride and hydrogen fluoride and R22. Thus, the present invention minimizes the acid formation and accompanying metallic corrosion, lubricant decomposition, and R12 conversion to R22. The present invention advantageously eliminates the need for removing all mineral oil remaining in a system which is to be retrofitted with R134a.

The present invention also provides an additive which substantially reduces the reaction of R12 with hydrogen-contributing lubricants which are miscible with R134a. In accordance with the present invention, phenol and aromatic or fluorinated alkyl epoxide are added to a refrigeration system containing R12 and hydrogen-contributing lubricants which are miscible with R134a. As mentioned previously, we have found that in the presence of phenol and aromatic epoxide, R12 and hydrogen-contributing lubricants which are miscible with R134a will form only minimal amounts of acids such as hydrogen chloride and hydrogen fluoride and R22. As such, the present invention advantageously eliminates the need for removing all R12 remaining in a system which is to be retrofitted with R134a.

The present invention also provides an additive which substantially reduces the reaction of R12 with currently used hydrogen-contributing lubricants and hydrogen-contributing lubricants which are miscible with R134a. In accordance with the present invention, phenol and aromatic or fluorinated alkyl epoxide are added to a refrigeration system containing R12, currently used hydrogen-contributing lubricants, and hydrogen-contributing lubricants which are miscible with R134a. As mentioned previously, we have found that in the presence of phenol and aromatic epoxide, R12, currently used hydrogen-contributing lubricants, and hydrogen-contributing lubricants which are miscible with R134a form minimal amounts of acids such as hydrogen chloride and hydrogen fluoride and R22.

As such, the present invention provides a composition for use in compression refrigeration and air-conditioning comprising: (a) chlorine-containing refrigerant selected from the group consisting of hydrochlorocarbon, chlorofluorocarbon, and hydrochlorofluorocarbon; (b) hydrogen-contributing lubricant; and (c) a composition comprising (i) at least one phenol and (ii) at least one aromatic or fluorinated alkyl epoxide wherein the composition (c) substantially reduces the removal of chlorine or chlorine and fluorine from the chlorine-containing refrigerant (a) and replacement of the halogen with a hydrogen from the hydrogen-contributing lubricant (b).

The present invention also provides a composition for use in compression refrigeration and air-conditioning comprising: (a) chlorine-containing refrigerant selected from the group consisting of hydrochlorocarbon, chlorofluorocarbon, and hydrochlorofluorocarbon; (b) hydrogen-contributing lubricant which is miscible with fluorocarbon or hydrofluorocarbon refrigerant; and (c) composition comprising (i) at least one phenol and (ii) at least one aromatic or fluorinated alkyl epoxide wherein the composition (c) substantially reduces the removal of chlorine or chlorine and fluorine from the chlorine-containing refrigerant (a) and replacement of the halogen with hydrogen from the hydrogen-contributing lubricant (b).

The present invention also provides a composition for use in compression refrigeration and air-conditioning comprising: (a) chlorine-containing refrigerant selected from the group consisting of hydrochlorocarbon, chlorofluorocarbon, and hydrochlorofluorocarbons; (b) hydrogen-contributing lubricant which is not miscible with fluorocarbon or hydrofluorocarbon refrigerant; (c) hydrogen-contributing lubricant which is miscible with fluorocarbon or hydrofluorocarbon refrigerant; and (d) composition comprising (i) at least one phenol and (ii) at least one aromatic or fluorinated alkyl epoxide wherein the composition (d) substantially reduces the removal of chlorine or chlorine and fluorine from the chlorine-containing refrigerant (a) and replacement of the halogen with a hydrogen from the hydrogen-contributing lubricant (b).

The present invention also provides a composition for use in compression refrigeration and air-conditioning comprising: (a) chlorine-containing refrigerant selected from the group consisting of hydrochlorocarbon, chlorofluorocarbon, and hydrochlorofluorocarbon; (b) hydrogen-contributing lubricant which is not miscible with fluorocarbon or hydrofluorocarbon refrigerant; (c) hydrogen-contributing lubricant which is miscible with fluorocarbon or hydrofluorocarbon refrigerant; (d) composition comprising (i) at least one phenol and (ii) at least one aromatic or fluorinated alkyl epoxide wherein the composition (d) substantially reduces the removal of chlorine or chlorine and fluorine from the chlorine-containing refrigerant (a) and replacement of the halogen with hydrogen from the hydrogen-contributing lubricant (c); and (e) fluorocarbon or hydrofluorocarbon refrigerant.

The term "hydrochlorocarbon" as used herein means a compound having hydrogen, chlorine, and carbon atoms. The term "chlorofluorocarbon" as used herein means a compound having chlorine, fluorine, and carbon atoms. The term "hydrochlorofluorocarbon" as used herein means a compound having hydrogen, chlorine, fluorine, and carbon atoms. The term "fluorocarbon" as used herein means a compound having fluorine and carbon atoms. The term "hydrofluorocarbon" as used herein means a compound having hydrogen, fluorine, and carbon atoms.

The term "hydrogen-contributing lubricant" means a lubricant which in the presence of a hydrochlorocarbon, chlorofluorocarbon, or hydrochlorofluorocarbon refrigerant, contributes a hydrogen so that the refrigerant chlorine and the lubricant hydrogen form hydrogen chloride. The term "lubricant which is miscible with fluorocarbon or hydrofluorocarbon refrigerant" means a lubricant which is miscible with the refrigerant at some useful composition in the useful range of −60° to 100°. The term "lubricant which is not miscible with fluorocarbon or hydrofluorocarbon refrigerant" means a lubricant which has miscibility characteristics which are the same as or less than those of mineral oil.

The present invention also provides a method of minimizing the reaction between a hydrochlorocarbon, chlorofluorocarbon, or hydrochlorofluorocarbon refrigerant and a hydrogen-containing lubricant. The method comprises the step of: employing a composition comprising: (i) at least one phenol and (ii) at least one aromatic or fluorinated alkyl epoxide wherein the composition substantially reduces the removal of chlorine or chlorine or fluorine from the refrigerant and replacement of said halogen with hydrogen from the hydrogen-contributing lubricant.

Other advantages of the present invention will become apparent from the following description and the appended claims.

DESCRIPTION OF THE PREFERRED EMBODIMENTS

The stabilizing composition of the present invention comprises (i) phenol and (ii) aromatic or fluorinated alkyl epoxide. Any phenol can be used for this stabilizing composition. Preferably, the phenol is selected from the group consisting of:
4,4'-methylenebis(2,6-di-tert-butylphenol);
4,4'-bis(2,6-di-tert-butylphenol);
4,4'-bis(2-methyl-6-tert-butylphenol);
2,2'-methylenebis(4-ethyl-6-tert-butylphenol);
2,2'-methylenebis(4-methyl-6-tert-butylphenol);
4,4'-butylidenebis(3-methyl-6-tert-butylphenol);
4,4'-isopropylidenebis(2,6-di-tert-butylphenol);
2,2'-methylenebis(4-methyl-6-nonylphenol);
2,2'-isobutylidenebis(4,6-dimethylphenol);
2,2'-methylenebis(4-methyl-6-cyclohexylphenol);
2,6-di-tert-4-methylphenol;
2,6-di-tert-4-ethylphenol;
2,4-dimethyl-6-tert-butylphenol;
2,6-di-tert-α-dimethylamino-p-cresol;
2,6-di-tert-butyl-4(N,N'-dimethylaminomethylphenol);
4,4'-thiobis(2-methyl-6-tert-butylphenol);
4,4'-thiobis(3-methyl-6-tert-butylphenol);
2,2'-thiobis(4-methyl-6-tert-butylphenol);
bis(3-methyl-4-hydroxy-5-tert-butylbenzyl) sulfide;
bis(3,5-di-tert-4-hydroxybenzyl)sulfide; and 2,2- or 4,4-biphenyldiols and derivatives thereof. Other preferred phenols include hydroquinone, t-butyl hydroquinone, and other derivatives of hydroquinone. The most preferred phenols are hydroquinone and 2,6-di-tert-4-methylphenol. Mixtures of the phenols may be used in addition to the use of a single phenol in the present invention.

The term "phenol" as used herein includes sterically hindered phenols.

Any aromatic epoxide or fluorinated alkyl epoxide can be used in the stabilizing composition. Examples of useful aromatic epoxides are of the formula $$R_1-M-R_2$$

wherein $R_2$ is

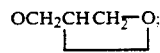

$R_1$ is hydrogen, alkyl, aryl, or $R_2$; and M is phenyl or naphthyl. Preferably, the aromatic epoxide is selected from the group consisting of butylphenylglycidyl ether; pentylphenylglycidyl ether; hexylphenylglycidyl ether; heptylphenylglycidyl ether; octylphenylglycidyl ether; nonylphenylglycidyl ether; glydicyl methyl phenyl ether; decylphenylglycidyl ether; 1,4-diglycidyl phenyl ether and derivatives thereof; 1,4-diglycidyl naphthyl ether and derivatives thereof; and 2,2'[[[5-heptadecafluorooctyl]1,3phenylene]bis[[2,2,2trifluoromethyl]ethylidene]oxymethylene]bisoxirane and derivatives thereof. Other preferred aromatic epoxides include naphthyl glycidyl ether; 4-methoxyphenyl glycidyl ether; and derivatives of naphthyl glycidyl ether. The most preferred epoxide is naphthyl glycidyl ether. Mixtures of aromatic epoxides or fluorinated alkyl epoxides may be used in addition to the use of a single aromatic or fluorinated alkyl epoxide in the present invention.

Examples of useful fluorinated alkyl epoxides are of the formula

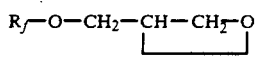

wherein $R_f$ is fluorinated or perfluorinated alkyl group.

The ratio of phenol to aromatic epoxide or fluorinated alkyl epoxide in the stabilizing composition can be varied from 1:99 to 99:1.

In a preferred embodiment, the stabilizer is added to a composition of chlorine-containing refrigerant and hydrogen-contributing lubricant. For this use, any combination of phenol and aromatic or fluorinated alkyl epoxide which substantially reduces the removal of chlorine or chlorine and fluorine from the chlorine-containing refrigerant and replacement of the halogen with hydrogen from the hydrogen-contributing lubricant can be used. Preferably, the phenols and aromatic or fluorinated alkyl epoxides listed above are used.

Preferably, the chlorine-containing refrigerant is a hydrochlorocarbon, chlorofluorocarbon, or hydrochlorofluorocarbon refrigerant which is selected from those listed in Table I below.

TABLE I

| Number | Chemical Name | Formula |
|---|---|---|
| 11 | Trichlorofluoromethane | $CCl_3F$ |
| 12 | Dichlorodifluoromethane | $CCl_2F_2$ |
| 13 | Chlorotrifluoromethane | $CClF_3$ |
| 22 | Chlorodifluoromethane | $CHClF_2$ |
| 40 | Chloromethane | $CH_3Cl$ |
| 113 | Trichlorotrifluoroethane | $CCl_2FCClF_2$ |
| 114 | Dichlorotetrafluoroethane | $CClF_2CClF_2$ |
| 115 | Chloropentafluoroethane | $CClF_2CF_3$ |
| 124 | Chlorotetrafluoroethane | $CHClFCF_3$ |
| 124a | Chlorotetrafluoroethane | $CClF_2CHF_2$ |
| 142b | Chlorodifluoroethane | $CClF_2CH_3$ |
| 501 | R12/R22 | |
| 502 | R22/R115 | |

The above chlorine-containing refrigerants are commercially available. Preferably, R12 is used.

Any currently used hydrogen-contributing lubricant can be used in the present invention. Preferably, the hydrogen-contributing lubricant is selected from the group consisting of mineral oil, alkyl benzenes, and esters. Mineral oil, which is paraffin oil or naphthenic oil, is commercially available. Commercially available alkyl benzene lubricants include Zerol 150 (registered trademark). Commercially available esters include neopentyl glycol dipelargonate which is available as Emery 2917 (registered trademark) and Hatcol 2370 (registered trademark).

When a hydrogen-contributing lubricant is present in an amount of at least about 0.5 percent by weight based on the chlorine-containing refrigerant, the reaction of the chlorine-containing refrigerant and the hydrogen-contributing lubricant occurs.

Preferably, the amount of phenol and aromatic or fluorinated alkyl epoxide used is about 0.01 to about 5 percent by weight based on the amount of the hydrogen-contributing lubricant. The ratio of phenol to aromatic or fluorinated alkyl epoxide can be varied from 1:99 to 99:1.

Any hydrogen-containing lubricant which is miscible with fluorocarbon or hydrofluorocarbon refrigerant can be used in the present invention. Preferably, the hydrogen-containing lubricant which is miscible with fluorocarbon or hydrofluorocarbon refrigerant includes the polyoxyalkylene glycols of commonly assigned U.S. Pat. No. 4,755,316 which is incorporated herein by reference. Such polyoxyalkylene glycols have a molecular weight between about 300 and about 2000, a viscosity of about 25 to about 150 centistokes at 37° C., and a viscosity index of at least 20. The polyoxyalkylene glycols preferably have at least 80 percent propylene oxide units; the remaining units may be ethylene oxide, butylene oxide, or other units such as esters and olefins which may be polymerized with propylene oxide.

The polyoxyalkylene glycols may also be capped with at least one hydrocarbon group such as alkyl, aryl, or ester. A preferred example of such a capped polyoxyalkylene glycol is a copolymer of ethylene oxide and propylene oxide wherein one end is capped with a butyl group.

Other preferred hydrogen-containing lubricants include the polyoxyalkylene glycols having a cap of a fluorinated alkyl group on at least one end thereof of commonly assigned U.S. Pat. No. 4,975,212 which is incorporated herein by reference. These glycols have a molecular weight between about 300 and about 3,000, a viscosity of about 5 to about 150 centistokes at 37° C., and a viscosity index of at least 20.

Preferably, the foregoing fluorinated lubricants comprise the formula (I)

wherein m is 4 to 36, n is 0 to 36, $R_2$ is —$CH(CH_3)CH_2$— or a direct bond, $R_1$ and $R_4$ are independently selected from the group consisting of hydrogen, alkyl group, and fluorinated alkyl group, $R_1$ can also be a residue of a compound having 1 to 8 active hydrogens, and A and B are the same or different and selected from the group consisting of methyl, ethyl, propyl, or butyl. At least one of $R_1$ and $R_4$ is a fluorinated alkyl group. Examples of alkyl groups include methyl, ethyl, propyl, and butyl. The lubricant may be terminated by a hydrogen at one end and a fluorinated alkyl group at the other end, by an alkyl group at one end and a fluorinated alkyl group at the other end, or by a fluorinated alkyl group at both ends. The fluorinated alkyl group may be branched or straight chain as long as fluorine atoms are attached thereto.

The foregoing fluorinated lubricants may be formed by flourinating polyoxyalkylene glycols. The polyoxyalkylene glycols used may have primary carbons at both ends, a primary carbon at one end and a secondary carbon at the other end, or secondary carbons at both ends. Preferably, the polyoxyalkylene glycols used have a primary carbon at one end and a secondary carbon at the other end or secondary carbons at both ends.

In a more preferred embodiment, at least one of $R_1$ and $R_4$ is a fluorinated alkyl group of the formula (II):

$$-(CH_2)_x(CF_2)_yCF_3$$

wherein x is 1 to 4 and y is 0 to 15. More preferably, x is 1 and y is 0 so that at least one of $R_1$ and $R_4$ is a fluorinated alkyl group of the formula $-CH_2CH_3$ or x is 1 and y is 2 so that at least one of $R_1$ and $R_4$ is a fluorinated alkyl group of the formula $-CH_2(CF_2)_2CF_3$. Even more preferably, both $R_1$ and $R_4$ are fluorinated alkyl groups, m is 7 to 34, and n is 0.

The most preferred lubricating compositions are $$CF_3CH_2O[CH_2CH(CH_3O)]_mCH_2CF_3$$

$$CF_3(CF_2)_2CH_2O[CH_2CH(CH_3)O]_mCH_2(CF_2)_2CF_3$$

$$CF_3CH_2OCH(CH_3)CH_2O[CH_2CH(CH_3)O]_mCH_2CF_3$$

$$CF_3(CF_2)_2CH_2OCH(CH_3)CH_2O[CH_2CH(CH_3)O]_mCH_2(CF_2)_2CF_3$$

where m is 7 to 34.

Generally, the foregoing fluorinated lubricating compositions may be formed by capping a polyoxyalkylene glycol with at least one fluorinated alkyl group. The lubricating compositions may be formed by copolymerizing ethylene and propylene oxides and terminating the resulting copolymer with at least one fluorinated alkyl group.

Preferably, the foregoing fluorinated lubricants wherein one end has an alkyl group and the other end has a fluorinated alkyl group or both ends have fluorinated alkyl groups are formed as follows. The polyoxyalkylene glycol is converted to the tosylate by treatment with p-toluenesulfonyl chloride in a suitable base such as pyridine and then the tosylated polyglycol is reacted with the sodium alkoxide of the appropriate fluorinated alcohol.

Preferably, the foregoing fluorinated lubricants wherein one end has a hydroxyl group and the other has a fluorinated alkyl group are formed as follows. An alcohol initiator such as the sodium alkoxide of trifluoroethanol is used in the polymerization of polypropylene oxide.

Most preferably, the fluorinated lubricant is a fluorinated copolymer of butylene oxide and propylene oxide or is a mixture of fluorinated butylene oxide and fluorinated propylene oxide.

When a hydrogen-contributing lubricant is present in an amount of at least about 0.5 percent by weight based on the chlorine-containing refrigerant, the reaction of the chlorine-containing refrigerant and the hydrogen-contributing lubricant occurs.

Preferably, the fluorocarbon or hydrofluorocarbon refrigerant is selected from those listed those listed in Table II below.

TABLE II

| Number | Chemical Name | Formula |
|--------|---------------|---------|
| 23 | Trifluoromethane | $CHF_3$ |
| 32 | Difluoromethane | $CH_2F_2$ |
| 116 | Hexafluoroethane | $CF_3CF_3$ |
| 125 | Pentafluoroethane | $C_2HF_5$ |
| 134a | Tetrafluoroethane | $CF_3CFH_2$ |
| 143a | 1,1,1-trifluoroethane | $CF_3CH_3$ |
| 152a | Difluoroethane | $CHF_2CH_3$ |
| C216 | Cycloperfluoropropane | $C_3F_6$ |
| C318 | Cycloperfluorobutane | $C_4F_8$ |

The above fluorocarbon and hydrofluorocarbon refrigerants are commercially available. Preferably, R134a is used. Until R134a becomes available in commercial quantities, it may be produced by any known method including reacting ethylene with carbon having elemental fluorine adsorbed therein as taught by commonly assigned U.S. Pat. No. 4,937,398 which is incorporated herein by reference.

The term "stabilizing amounts" means that total amount of phenol and aromatic epoxide which prevents the reaction of the chlorine-containing refrigerant and the hydrogen-contributing lubricant. Preferably, the amount of phenol and aromatic epoxide used is about 0.01 to about 5 percent by weight based on the amount of the hydrogen-contributing lubricant. The ratio of phenol to aromatic epoxide can be varied from 1:99 to 99:1.

The present invention is more fully illustrated by the following non-limiting Examples.

EXAMPLES 1 THROUGH 253

The stabilizing compositions in Table III are made. In Table III, the abbreviations are as follows:

A - 4,4'-methylenebis(2,6-di-tert-butylphenol);
B - 4,4'-bis(2,6-di-tert-butylphenol);
C - 4,4'-bis(2-methyl-6-tert-butylphenol);
D - 2,2'-methylenebis(4-ethyl-6-tert-butylphenol);
E - 2,2'-methylenebis(4-methyl-6-tert-butylphenol);
F - 4,4'-butylidenebis(3-methyl-6-tert-butylphenol);
G - 4,4'-isopropylidenebis(2,6-di-tert-butylphenol);
H - 2,2'-methylenebis(4-methyl-6-nonylphenol);
I - 2,2'-isobutylidenebis(4,6-dimethylphenol);
J - 2,2'-methylenebis(4-methyl-6-cyclohexylphenol);
K - 2,6-di-tert-4-methylphenol;
L - 2,6-di-tert-4-ethylphenol;
M - 2,4-dimethyl-6-tert-butylphenol;
N - 2,6-di-tert-α-dimethylamino-p-cresol;
O - 2,6-di-tert-butyl-4(N,N'dimethylaminomethylphenol);
P - 4,4'-thiobis(2-methyl-6-tert-butylphenol);
Q - 4,4'-thiobis(3-methyl-6-tert-butylphenol);
R - 2,2'-thiobis(4-methyl-6-tert-butylphenol;
S - bis(3-methyl-4-hydroxy-5-tert-butylbenzyl) sulfide;
T - bis(3,5-di-tert-4-hydroxybenzyl)sulfide:
U - butylated hydroxytoluene;
V - hydroquinone;
W - t-butyl hydroquinone.
AA - butylphenylglycidyl ether;
BB - pentylphenylglycidyl ether;
CC - hexylphenylglycidyl ether;
DD - heptylphenylglycidyl ether;
EE - octylphenylglycidyl ether;
FF - nonylphenylglycidyl ether;
GG - glycidyl methyl phenyl ether;
HH - decylphenylglycidyl ether;

II - 2,2'[[[5heptadecafluorooctyl]-1,3phenylene]-bis[[2,2,2trifluoromethyl]-ethylidene]oxymethylene]bisoxirane;
JJ - naphthyl glycidyl ether;
KK - 4-methoxyphenyl glycidyl ether.

TABLE III

| Example | Phenol | Aromatic Epoxide |
|---|---|---|
| 1 | A | AA |
| 2 | A | BB |
| 3 | A | CC |
| 4 | A | DD |
| 5 | A | EE |
| 6 | A | FF |
| 7 | A | GG |
| 8 | A | HH |
| 9 | A | II |
| 10 | A | JJ |
| 11 | A | KK |
| 12 | B | AA |
| 13 | B | BB |
| 14 | B | CC |
| 15 | B | DD |
| 16 | B | EE |
| 17 | B | FF |
| 18 | B | GG |
| 19 | B | HH |
| 20 | B | II |
| 21 | B | JJ |
| 22 | B | KK |
| 23 | C | AA |
| 24 | C | BB |
| 25 | C | CC |
| 26 | C | DD |
| 27 | C | EE |
| 28 | C | FF |
| 29 | C | GG |
| 30 | C | HH |
| 31 | C | II |
| 32 | C | JJ |
| 33 | C | KK |
| 34 | D | AA |
| 35 | D | BB |
| 36 | D | CC |
| 37 | D | DD |
| 38 | D | EE |
| 39 | D | FF |
| 40 | D | GG |
| 41 | D | HH |
| 42 | D | II |
| 43 | D | JJ |
| 44 | D | KK |
| 45 | E | AA |
| 46 | E | BB |
| 47 | E | CC |
| 48 | E | DD |
| 49 | E | EE |
| 50 | E | FF |
| 51 | E | GG |
| 52 | E | HH |
| 53 | E | II |
| 54 | E | JJ |
| 55 | E | KK |
| 56 | F | AA |
| 57 | F | BB |
| 58 | F | CC |
| 59 | F | DD |
| 60 | F | EE |
| 61 | F | FF |
| 62 | F | GG |
| 63 | F | HH |
| 64 | F | II |
| 65 | F | JJ |
| 66 | F | KK |
| 67 | G | AA |
| 68 | G | BB |
| 69 | G | CC |
| 70 | G | DD |
| 71 | G | EE |
| 72 | G | FF |
| 73 | G | GG |
| 74 | G | HH |
| 75 | G | II |
| 76 | G | JJ |
| 77 | G | KK |
| 78 | H | AA |
| 79 | H | BB |
| 80 | H | CC |
| 81 | H | DD |
| 82 | H | EE |
| 83 | H | FF |
| 84 | H | GG |
| 85 | H | HH |
| 86 | H | II |
| 87 | H | JJ |
| 88 | H | KK |
| 89 | I | AA |
| 90 | I | BB |
| 91 | I | CC |
| 92 | I | DD |
| 93 | I | EE |
| 94 | I | FF |
| 95 | I | GG |
| 96 | I | HH |
| 97 | I | II |
| 98 | I | JJ |
| 99 | I | KK |
| 100 | J | AA |
| 101 | J | BB |
| 102 | J | CC |
| 103 | J | DD |
| 104 | J | EE |
| 105 | J | FF |
| 106 | J | GG |
| 107 | J | HH |
| 108 | J | II |
| 109 | J | JJ |
| 110 | J | KK |
| 111 | K | AA |
| 112 | K | BB |
| 113 | K | CC |
| 114 | K | DD |
| 115 | K | EE |
| 116 | K | FF |
| 117 | K | GG |
| 118 | K | HH |
| 119 | K | II |
| 120 | K | JJ |
| 121 | K | KK |
| 122 | L | AA |
| 123 | L | BB |
| 124 | L | CC |
| 125 | L | DD |
| 126 | L | EE |
| 127 | L | FF |
| 128 | L | GG |
| 129 | L | HH |
| 130 | L | II |
| 131 | L | JJ |
| 132 | L | KK |
| 133 | M | AA |
| 134 | M | BB |
| 135 | M | CC |
| 136 | M | DD |
| 137 | M | EE |
| 138 | M | FF |
| 139 | M | GG |
| 140 | M | HH |
| 141 | M | II |
| 142 | M | JJ |
| 143 | M | KK |
| 144 | N | AA |
| 145 | N | BB |
| 146 | N | CC |
| 147 | N | DD |
| 148 | N | EE |
| 149 | N | FF |
| 150 | N | GG |
| 151 | N | HH |
| 152 | N | II |
| 153 | N | JJ |
| 154 | N | KK |
| 155 | O | AA |

TABLE III-continued

| Example | Phenol | Aromatic Epoxide |
|---|---|---|
| 156 | O | BB |
| 157 | O | CC |
| 158 | O | DD |
| 159 | O | EE |
| 160 | O | FF |
| 161 | O | GG |
| 162 | O | HH |
| 163 | O | II |
| 164 | O | JJ |
| 165 | O | KK |
| 166 | P | AA |
| 167 | P | BB |
| 168 | P | CC |
| 169 | P | DD |
| 170 | P | EE |
| 171 | P | FF |
| 172 | P | GG |
| 173 | P | HH |
| 174 | P | II |
| 175 | P | JJ |
| 176 | P | KK |
| 177 | Q | AA |
| 178 | Q | BB |
| 179 | Q | CC |
| 180 | Q | DD |
| 181 | Q | EE |
| 182 | Q | FF |
| 183 | Q | GG |
| 184 | Q | HH |
| 185 | Q | II |
| 186 | Q | JJ |
| 187 | Q | KK |
| 188 | R | AA |
| 189 | R | BB |
| 190 | R | CC |
| 191 | R | DD |
| 192 | R | EE |
| 193 | R | FF |
| 194 | R | GG |
| 195 | R | HH |
| 196 | R | II |
| 197 | R | JJ |
| 198 | R | KK |
| 199 | S | AA |
| 200 | S | BB |
| 201 | S | CC |
| 202 | S | DD |
| 203 | S | EE |
| 204 | S | FF |
| 205 | S | GG |
| 206 | S | HH |
| 207 | S | II |
| 208 | S | JJ |
| 209 | S | KK |
| 210 | T | AA |
| 211 | T | BB |
| 212 | T | CC |
| 213 | T | DD |
| 214 | T | EE |
| 215 | T | FF |
| 216 | T | GG |
| 217 | T | HH |
| 218 | T | II |
| 219 | T | JJ |
| 220 | T | KK |
| 221 | U | AA |
| 222 | U | BB |
| 223 | U | CC |
| 224 | U | DD |
| 225 | U | EE |
| 226 | U | FF |
| 227 | U | GG |
| 228 | U | HH |
| 229 | U | II |
| 230 | U | JJ |
| 231 | U | KK |
| 232 | V | AA |
| 233 | V | BB |
| 234 | V | CC |
| 235 | V | DD |
| 236 | V | EE |
| 237 | V | FF |
| 238 | V | HH |
| 239 | V | II |
| 240 | V | JJ |
| 241 | V | KK |
| 242 | W | AA |
| 243 | W | BB |
| 244 | W | CC |
| 245 | W | DD |
| 246 | W | EE |
| 247 | W | FF |
| 248 | W | GG |
| 249 | W | HH |
| 250 | W | II |
| 251 | W | JJ |
| 252 | W | KK |

EXAMPLES 253 THROUGH 504

Each stabilizing composition of Examples 1 through 252 is combined with R12 and mineral oil to form a stabilized composition.

EXAMPLES 505 THROUGH 756

Polyoxyalkylene glycol having a cap of a fluorinated alkyl group on one end thereof is combined with each stabilizing composition of Examples 1 through 252.

EXAMPLES 757 THROUGH 1,008

Polyoxyalkylene glycol having a cap of a fluorinated alkyl group on one end thereof is combined with each stabilized composition of Examples 253 through 504.

EXAMPLES 1,009 THROUGH 1,260

R134a is combined with each composition of Examples 757 through 1,008.

COMPARATIVES A THROUGH F AND EXAMPLES 1,261 THROUGH 1,263

The stability of a refrigeration system that uses CRC-12 with hydrogen-contributing lubricants can be measured using two criteria which are the concentration of chloride and fluoride ions present in the system, and the amount of HCFC-22 formed in the systems. In the following Examples and Comparatives, both criteria were used to judge the stability of the systems.

The stability tests were conducted using a sealed tube procedure. The refrigerant and lubricant were sealed in a glass tube with aluminum, valve steel, and copper. The tubes were put into an oven at 149° C. for 2 weeks. The tubes were removed from the oven, visually inspected, and then opened. The refrigerant was collected and analyzed by gas chromatography. The oil and metal parts in the tubes were washed with hexane and a buffer solution. The hexane solution was then extracted with the same buffer solution. The buffer solutions were joined and analyzed for chloride and fluoride ions using gel permeation.

The results are in Table IV below. C-A stands for Comparative A, C-B stands for Comparative B, C-C stands for Comparative C, C-D stands for Comparative D, C-E stands for Comparative E, and C-F stands for Comparative F. E-1261 stands for present Example 1261, E-1262 stands for present Example 1262, and E-1263 stands for present Example 1263. Stab stands for Stabilizer.

For each Comparative and Example, the refrigerant used was R12 and the lubricant used was mineral oil. The ratio of R12 to mineral oil was 3:2.

In Table IV, the abbreviations of the stabilizers are as follows:

U = glycidyl isopropyl ether;
V = 2,2'[[[5-heptadecafluorooctyl]1,3phenylene]bis [[2,2,2trifluoromethyl]ethylidene]oxymethylene]-bisoxirane;
W = butylated hydroxytoluene;
X = hydroquinone;
Y = glycidyl naphthyl ether; and
Z = glycidyl methyl phenyl ether. The total additive for any Comparative or Example was 2% by weight based on the weight of the mineral oil.

In Table IV, "Fluoride" means the (fluoride concentration with the additives)/(fluoride concentration without the additives). "Chloride" means the (chloride concentration with the additives)/(chloride concentration without the additives). "R22" means the (R22 concentration with the additives)/((R22 concentration without the additives).

TABLE IV

|  | Stab | Fluoride | Chloride | R22 |
| --- | --- | --- | --- | --- |
| C-A | None | 1 | 1 | 1.0 |
| C-B | X | 1.3 | 0.85 | 1.0 |
| C-C | V | 1.22 | 0.64 | 1.01 |
| C-D | U + W | 0.45 | 0.17 | 0.74 |
| C-E | U + X | 1.3 | 0.24 | 1.2 |
| C-F | X + Z | 1.32 | 0.19 | 0.97 |
| E-1261 | W + Z | 0.23 | 0.02 | 0.23 |
| E-1262 | W + Y | 0.16 | 0.01 | 0.13 |
| E-1263 | W + Y | 0.25 | 0.03 | 0.22 |

Comparative A is a baseline experiment for stability of CFC-12 with mineral oil. The art is looking for any reduction in the amount of chloride and fluoride in an R12 system. The concentrations in the other comparatives are given as a fraction of the concentration of the baseline experiment for the series of experiments. Thus, in Comparative B for example, the fluoride ratio was 1.3 times that of the corresponding baseline experiment.

In Comparative B, a phenol alone was added to the composition of R12 and mineral oil. The concentrations of chloride ions, fluoride ions, and R-22 were practically unchanged and thus, were unacceptable.

In comparative C, an aromatic epoxide alone was added to the composition of R12 and mineral oil. The results were unacceptable.

In Comparative D, a phenol and non-aromatic epoxide were added to the composition of R12 and mineral oil. The amount of halide was worse than the baseline experiment. We believe that these results were due to the non-aromatic epoxide used.

In Comparative E, a phenol and non-aromatic epoxide were added to the composition of R12 and mineral oil. The amount of halide was unacceptable. We believe that these results were due to the non-aromatic epoxide used.

In Example 1261, a phenol and aromatic epoxide were added to the composition of R12 and mineral oil. Together, they are shown to be very effective. The concentration of the chloride ions is reduced to barely detectable levels and the amount of R-22 and fluoride ions formed is substantially reduced.

In Example 1262, another combination of phenol and aromatic epoxide was added to the composition of R12 and mineral oil. The combination is effective in reducing the formation of hydrogen chloride and hydrogen fluoride.

In Example 1263, another combination of hindered phenol and aromatic epoxide was added to the composition of R12 and mineral oil. These combinations are also effective.

COMPARATIVES G THROUGH J AND EXAMPLES 1,264 THROUGH 1,268

The procedure for Examples 1261 through 1263 above was repeated except that the lubricant used was bis(trifluoroethyl)polyoxypropylene ether. The refrigerant used was R12 and the ratio of R12 to lubricant was 3:2.

The results are in Table V below. C-G stands for Comparative G, C-H stands for Comparative H, C-I stands for Comparative I, C-J stands for Comparative J, and C-K stands for Comparative K. E-1264 stands for present Example 1264, E-1265 stand for present Example 1265, E-1266 stands for present Example 1266, E-1267 stands for present Example 1267, and E-1268 stands for present Example 1268. Stab stands for Stabilizer.

In Table V, the abbreviations of the stabilizers are as follows:

V = 2,2'[[[5-heptadecafluorooctyl]1,3phenylene]bis [[2,2,2trifluoromethyl]ethylidene]oxymethylene]-bisoxirane;
W = butylated hydroxytoluene;
X = hydroquinone;
Y = glycidyl naphthyl ether; and
Z = glycidyl methyl phenyl ether.

In Table V, "Fluoride" means the (fluoride concentration with the additives)/(fluoride concentration without the additives). "Chloride" means the (chloride concentration with the additives)/(chloride concentration without the additives). "R22" means the (R22 concentration with the additives)/((R22 concentration without the additives).

TABLE V

|  | Stab | Fluoride | Chloride | Wt. % R22 |
| --- | --- | --- | --- | --- |
| C-G | None | 1 | 1 | 1 |
| C-H | X | 1.0 | 0.82 | 1.0 |
| C-I | V | 0.01 | 0.01 | 0.3 |
| C-J | W | 0.17 | 0.1 | 0.4 |
| E-1264 | V + W | 0.0005 | 0.0001 | 0.032 |
| E-1265 | X + V | 0.07 | 0.01 | 0.11 |
| E-1266 | W + Y | 0.13 | 0.02 | 0.14 |
| E-1267 | X + Y | 0.005 | 0.0002 | 0.01 |
| E-1268 | X + Z | 0.01 | 0.002 | 0.02 |

Comparative G is a baseline experiment for stability of R12 with a lubricant. The concentrations in the other comparatives are given as a fraction of the concentration of the baseline experiment for the series of experiments. Thus, in Comparative J for example, the concentration of fluoride was 0.17 times that of the corresponding baseline experiment.

In Comparative H, a phenol alone was added to the composition of lubricant and R12. The concentrations of chloride, fluoride, and R-22 were practically unchanged and thus, were unacceptable.

In Comparative I, an aromatic epoxide alone was added to the composition of lubricant and R12. The amount of halide was considerably reduced to near zero. Although the amount of R-22 produced was reduced to 0.3 times that of the baseline, this was still unacceptable.

In Comparative J, another phenol alone was added to the composition of lubricant and R12. The concentrations of fluoride, chloride and R-22 were reduced to 0.17, 0.1, and 0.42 times that of the baseline. This level was still too high to be acceptable.

In Example 1264, a phenol and aromatic epoxide were added to the composition of lubricant and R12. These two were shown to be ineffective when used alone in Comparatives I and J. Together, they are shown to be very effective. The concentration of the chloride and fluoride ions are reduced to barely detectable levels and the amount of R-22 formed is 0.03 times that of the baseline.

In Example 1265, another combination of phenol and aromatic epoxide was added to the composition of lubricant and R12. These two were shown to be ineffective when used alone in Comparatives G and H. The combination is much more effective.

In Examples 1266 through 1268, other combinations of phenol and aromatic epoxide were added to the composition of lubricant and R12. These combinations are also effective.

COMPARATIVE K AND EXAMPLE 1,269

The procedure for Examples 1261 through 1263 above was repeated. For the lubricant, fluorinated polyoxypropylene glycol was mixed with 5 weight percent mineral oil. The total amount of additive was 2 percent by weight based on the total lubricant weight present. The ratio of R12 to total lubricant was 1:1. The results are in Table VI below.

C-K stands for Comparative K while E-1269 stands for present Example 1269. Stab stands for 1 percent by weight hydroquinone and 1 percent by weight glycidyl methyl phenyl ether.

In Table VI, "Fluoride" means (fluoride concentration with additives)/(fluoride concentration without additives). "Chloride" means (chloride concentration with additives)/(chloride concentration without additives). "R22" means (R22 concentration with additives)/(R22 concentration without additives).

TABLE VI

|  | Stab | Fluoride | Chloride | R22 |
|---|---|---|---|---|
| C-K | None | 1.0 | 1.0 | 1.0 |
| E-1269 | yes | 0.01 | 0.0001 | 0.02 | comparative K was a baseline experiment for stability of R12 with mineral oil and fluorinated polyoxypropylene glycol. The concentrations of the Example are given as a fraction of the concentration of the baseline.

In Example 9, a phenol and aromatic epoxide were added to the composition and were effective.

Having described the invention in detail and by reference to preferred embodiments thereof, it will be apparent that modifications and variations are possible without departing from the scope of the invention defined in the appended claims.

What is claimed is:

1. A stabilizing composition comprising: (i) phenol and (ii) fluorinated epoxide wherein the ratio of said phenol to said fluorinated epoxide is about 1:99 to about 99:1.

2. The stabilizing composition of claim 1 wherein said phenol is phenol selected from the group consisting of:
4,4'-methylenebis(2,6-di-tert-butylphenol);
4,4'-bis(2,6-di-tert-butylphenol);
4,4'-bis(2-methyl-6-tert-butylphenol);
2,2'-methylenebis(4-ethyl-6-tert-butylphenol);
2,2'-methylenebis(4-methyl-6-tert-butylphenol);
4,4'-butylidenebis(3-methyl-6-tert-butylphenol);
4,4'-isopropylidenebis(2,6-di-tert-butylphenol);
2,2'-methylenebis(4-methyl-6-nonylphenol);
2,2'-isobutylidenebis(4,6-dimethylphenol);
2,2'-methylenebis(4-methyl-6-cyclohexylphenol);
2,6-di-tert-4-methylphenol;
2,6-di-tert-4-ethylphenol;
2,4-dimethyl-6-tert-butylphenol;
2,6-di-tert-α-dimethylamino-p-cresol;
2,6-di-tert-butyl-4(N,N'-dimethylaminomethylphenol);
4,4'-thiobis(2-methyl-6-tert-butylphenol);
4,4'-thiobis(3-methyl-6-tert-butylphenol);
2,2'-thiobis(4-methyl-6-tert-butylphenol);
bis(3-methyl-4-hydroxy-5-tert-butylbenzyl) sulfide;
bis(3,5-di-tert-4-hydroxybenzyl)sulfide; hydroquinone;
t-butylhydroquinone; and mixtures thereof.

3. The stabilizing composition of claim 1 wherein said phenol is phenol selected from the group consisting of hydroquinone and 2,6-di-tert-4-methylphenol.

4. The stabilizing composition of claim 1 wherein said phenol is butylated hydroxytoluene.

5. The stabilizing composition of claim 1 wherein said phenol is hydroquinone.

6. The stabilizing composition of claim 1 wherein said fluorinated epoxide is fluorinated aromatic epoxide.

7. The stabilizing composition of claim 6 wherein said fluorinated aromatic epoxide is 2,2'[[[5-heptadecafluorooctyl]1,3phenylene]bis-[[2,2,2trifluoromethyl]ethylidene]oxymethylene]bisoxirane.

8. The stabilizing composition of claim 1 wherein said fluorinated epoxide is fluorinated alkyl epoxide.

9. The stabilizing composition of claim 8 wherein said fluorinated alkyl epoxide is of the formula

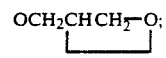

wherein $R_f$ is fluorinated or perfluorinated alkyl group.

10. The stabilizing composition of claim 1 wherein said phenol is butylated hydroxytoluene and said fluorinated epoxide is
2,2'[[[5-heptadecafluorooctyl]1,3phenylene]bis-[[2,2,2trifluoromethyl]ethylidene]oxymethylene]-bisoxirane.

11. The stabilizing composition of claim 1 wherein said phenol is hydroquinone and said fluorinated epoxide is 2,2'[[[5-heptadecafluorooctyl]1,3phenylene]bis-[[2,2,2trifluoromethyl]ethylidene]oxymethylene]bisoxirane.

* * * * *

UNITED STATES PATENT AND TRADEMARK OFFICE
CERTIFICATE OF CORRECTION

PATENT NO. : 5,156,768

DATED : October 20, 1992

INVENTOR(S) : Raymond Thomas, Ruth Chen and Kenneth Harris

It is certified that error appears in the above-identified patent and that said Letters Patent is hereby corrected as shown below:

Col. 18, line 46, "$OCH_2CHCH_2-O$" should read --$R_fOCH_2CHCH_2-O$--

Signed and Sealed this

Nineteenth Day of October, 1993

Attest:

BRUCE LEHMAN

Attesting Officer      Commissioner of Patents and Trademarks